US010114109B2

(12) United States Patent
Gazit et al.

(10) Patent No.: US 10,114,109 B2
(45) Date of Patent: Oct. 30, 2018

(54) LIDAR WITH HEXAGONAL LASER ARRAY

(71) Applicant: GM Global Technology Operations LLC, Detroit, MI (US)

(72) Inventors: Ran Y. Gazit, Ra'anana (IL); Oded Bialer, Petah Tikva (IL); Kobi J. Scheim, Pardess Hanna (IL); Ariel Lipson, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 276 days.

(21) Appl. No.: 15/145,956

(22) Filed: May 4, 2016

(65) Prior Publication Data

US 2016/0327637 A1 Nov. 10, 2016

Related U.S. Application Data

(60) Provisional application No. 62/158,293, filed on May 7, 2015.

(51) Int. Cl.
| | |
|---|---|
| *G01S 7/48* | (2006.01) |
| *G01S 7/481* | (2006.01) |
| *G01S 17/10* | (2006.01) |
| *G01S 17/42* | (2006.01) |
| *G01S 17/89* | (2006.01) |

(52) U.S. Cl.
CPC ........... *G01S 7/4811* (2013.01); *G01S 7/4815* (2013.01); *G01S 7/4816* (2013.01); *G01S 17/10* (2013.01); *G01S 17/42* (2013.01); *G01S 17/89* (2013.01)

(58) Field of Classification Search
CPC ............... G02F 1/133603; G02F 2001/133613
See application file for complete search history.

(56) References Cited

U.S. PATENT DOCUMENTS

| | | |
|---|---|---|
| 4,229,103 A | 10/1980 | Hipp |
| 7,649,593 B2 | 1/2010 | Yoon et al. |
| 8,139,202 B2 | 3/2012 | Henningsen |

(Continued)

FOREIGN PATENT DOCUMENTS

| | | |
|---|---|---|
| CN | 2657015 Y | 11/2004 |
| CN | 101329613 A | 12/2008 |

OTHER PUBLICATIONS

Chinese Office Action for CN Application No. 201610295326.0 dated Jan. 12, 2018, pp. 1-7.

*Primary Examiner* — Luke D Ratcliffe
(74) *Attorney, Agent, or Firm* — Cantor Colburn LLP

(57) ABSTRACT

An array lidar system and a method of assembling an array lidar system comprising a plurality of illuminators and a plurality of detectors includes designing a plurality of hexagons of a same size such that no gaps remain between adjacent ones of the plurality of hexagons, and designing an arrangement of the plurality of illuminators or the plurality of detectors according to a hexagonal construct, the designing including arranging one or more illuminators of the plurality of illuminators or one or more detectors of the plurality of detectors within respective ones of the plurality of hexagons, wherein the one or more illuminators or the one or more detectors is at a same position within each of the respective ones of the plurality of hexagons. Implementing the design is done by disposing the plurality of illuminators or the plurality of detectors according to the arrangement.

15 Claims, 9 Drawing Sheets

(56) References Cited

U.S. PATENT DOCUMENTS

2006/0244879 A1* 11/2006 Yoon .................. G02F 1/133603
            349/71
2007/0225778 A1* 9/2007 Heacock ............... A61F 9/0079
            607/88
2012/0038903 A1* 2/2012 Weimer .................... G01C 3/08
            356/4.07

* cited by examiner

LIDAR WITH HEXAGONAL LASER ARRAY

CROSS-REFERENCE TO RELATED APPLICATION

This application is a Non-Provisional of U.S. Provisional Application No. 62/158,293 filed May 7, 2015, the disclosure of which is incorporated herein by reference in its entirety.

FIELD OF THE INVENTION

The subject invention relates to lidar with a hexagonal laser array.

BACKGROUND

Lidar, which may be referred to as light radar or laser array light detection and ranging, refers generally to transmitting light at an object and receiving and processing a resulting reflection. An array of illuminators (e.g., lasers, light emitting diodes (LEDs)) may be used in an array lidar system to obtain reflections from a wider field of view than is possible with a single illuminator. Typically, a rectangular cell construct is used to determine an arrangement of the illuminators of the array. However, the number of illuminators required for a given field of view is not minimized with the rectangular cell construct. Accordingly, it is desirable to provide a different construct for arrangement of the illuminators of the array.

SUMMARY OF THE INVENTION

According to an exemplary embodiment, a method of assembling an array lidar system comprising a plurality of illuminators and a plurality of detectors includes designing a plurality of hexagons of a same size such that no gaps remain between adjacent ones of the plurality of hexagons; designing an arrangement of the plurality of illuminators or the plurality of detectors according to a hexagonal construct, the designing including arranging one or more illuminators of the plurality of illuminators or one or more detectors of the plurality of detectors within respective ones of the plurality of hexagons, wherein the one or more illuminators or the one or more detectors is at a same position within each of the respective ones of the plurality of hexagons; and implementing the design by disposing the plurality of illuminators or the plurality of detectors according to the arrangement.

According to another exemplary embodiment, an array lidar system includes a plurality of illuminators or detectors arranged according to a hexagonal construct, the hexagonal construct being comprised of a plurality of hexagonal shapes of a same size arranged with no gaps between adjacent ones of the plurality of hexagonal shapes, wherein one or more of the plurality of illuminators or detectors is arranged within a respective one of the plurality of hexagons and the one or more illuminators or detectors is at a same position within each of the respective ones of the plurality of hexagons; a first set of wires along a first axis; and a second set of wires along a second axis.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
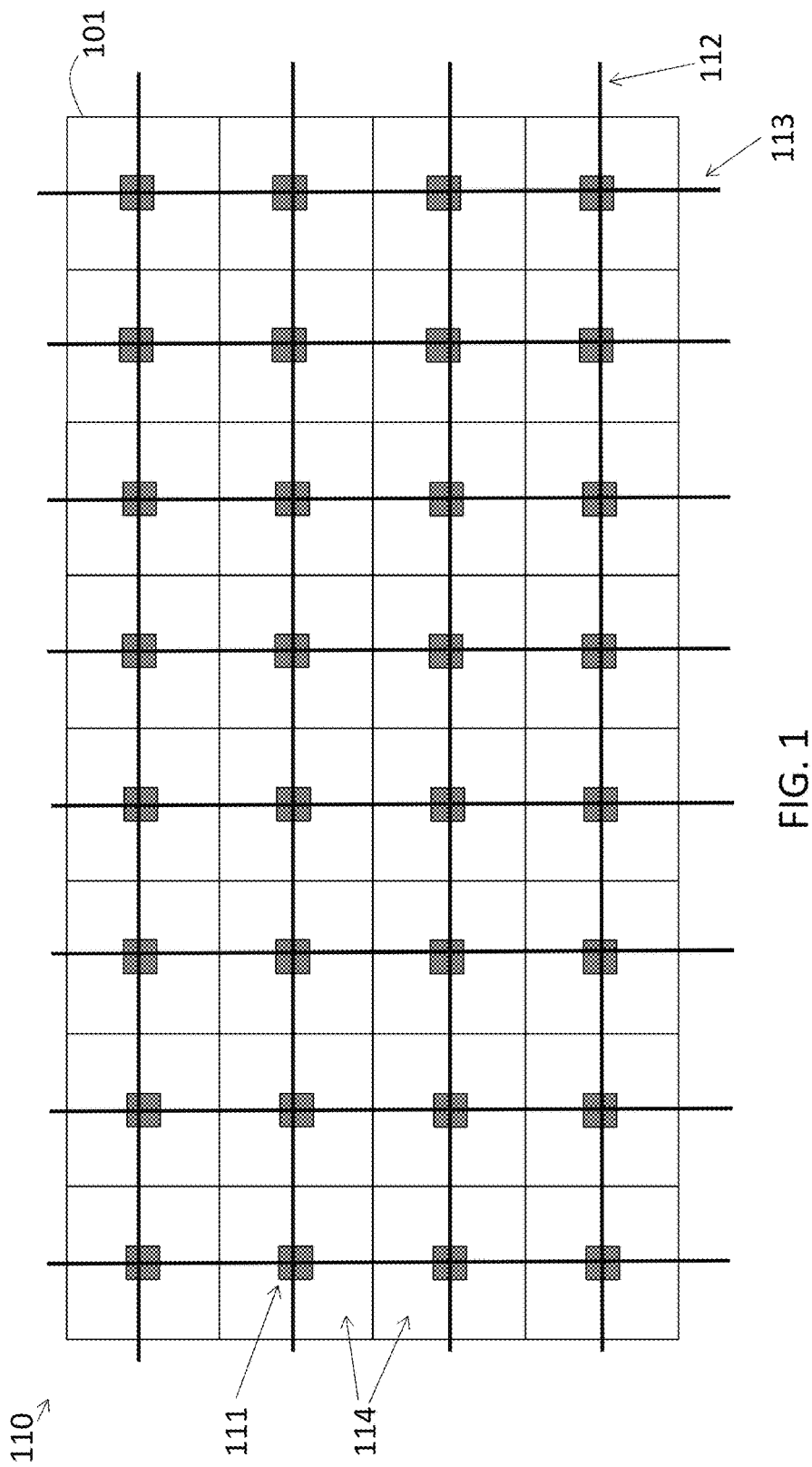
FIG. 1 shows a conventional array lidar construct.

As noted above, conventional array lidar design uses a rectangular cell construct to determine an arrangement of illuminators of the array lidar system. FIG. 1 shows a conventional array lidar 110 with a rectangular construct 101 for placement of the lasers 111. Rows and columns of rectangles 114 of the same size are drawn with no gaps between adjacent rectangles 114. A laser 111 is drawn at the center of each rectangle 114, and the design is implemented by placing the lasers 111 of the array according to the arrangement of the design. The rectangular construct 101 is associated with a perpendicular wiring arrangement as shown in FIG. 1. Each laser 111 has a ground wire 112 and a current-carrying wire 113 associated with it. According to existing wiring designs, the ground wires 112 and current-carrying wires 113 are arranged in a perpendicular grid with ground wires 112 for all the lasers 111 disposed along a first axis (e.g., horizontally) and current-carrying wires 113 for all the lasers 111 disposed along another axis that is perpendicular to the first axis (e.g., vertically). As the discussion of the embodiments below indicates, the construct shown in FIG. 1 represents an inefficient arrangement in that a larger area is needed for the lasers 111 of the array lidar 110 to obtain a given field of view.

Embodiments of the systems and methods detailed herein relate to using a hexagonal cell construct to determine the arrangement of illuminators of the array lidar system. A diagonal wiring scheme is associated with the hexagonal cell construct. According to the hexagonal construct, hexagons are drawn such that there is no gap between adjoining hexagons. An illuminator is drawn at the center of each hexagon or at a different point within the hexagon (the same respective point is used in all the hexagons). According to some embodiments, every hexagon may not be occupied by an illuminator. The design using this hexagonal construct is then implemented by placing the illuminators of the array according to the arrangement of the design, as detailed below. Additional components of a complete lidar system (e.g., processor, voltage source) are well-known and are, thus, not shown or discussed here. Throughout the description, lasers are referenced as a specific embodiment of illuminators for explanatory purposes. However, this reference is not intended to limit illuminators to any specific type, and any known illuminators used in lidar arrays are contemplated to be arranged according to the embodiments detailed herein.

Figure 2:
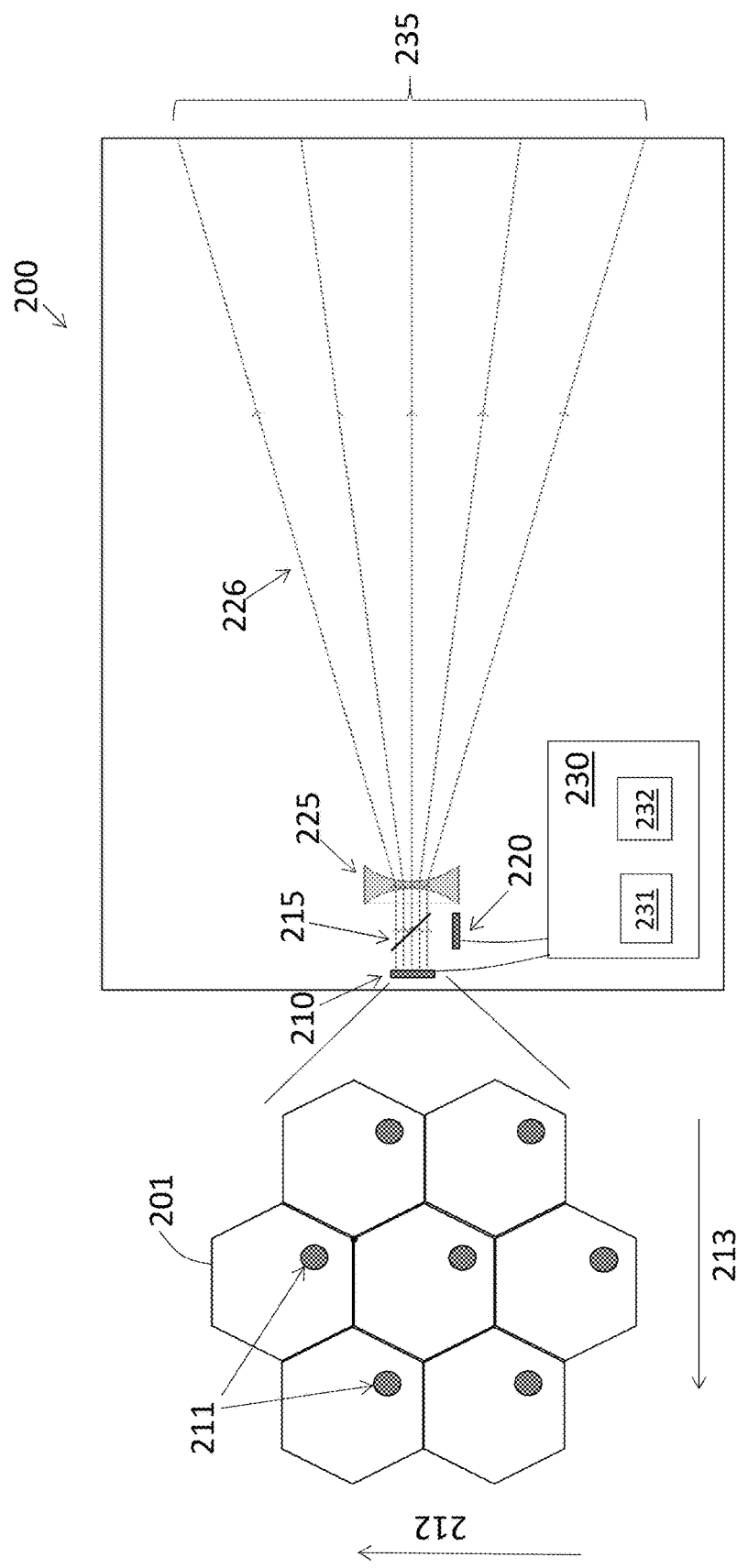
FIG. 2 is a block diagram of an exemplary array lidar system according to embodiments.

FIG. 2 is a block diagram of an exemplary array lidar system 200 according to embodiments. The array lidar 210 refers to an arrangement of two or more lasers 211 in an array such that their transmissions make up a field of view 235. The exemplary array lidar system 200 shown in FIG. 2 includes an array lidar 210 with lasers 211 arranged within a hexagonal construct 201. As the exemplary array lidar system 200 indicates, each laser 211 need not be at the center of each hexagonal construct 201 as long as every laser 211 is at the same location within its respective hexagonal construct 201. Additionally, once the hexagonal construct 201 is generated, more than one laser 211 may be arranged within each hexagon. For example, each of the hexagonal constructs 201 shown in FIG. 2 may be used to arrange one laser 211 as shown and another laser 211 at the center or near a different corner. Further, one or more of the hexagons of the hexagonal construct 201 may not be populated with a laser 211 at all.

The exemplary array lidar system 200 shown in FIG. 2 includes a semi-permeable mirror 215 that focuses light from each laser 211 of the array lidar 210 through a lens 225. The lens 225 disperses the laser beams 226, transmitted by each of the lasers 211 of the array lidar 210, across the field of view 235 as shown in the top-down perspective view in FIG. 2. An optical detector array 220 receives reflections resulting from the transmissions of the array lidar 210. The optical detector array 220 may have one or more optical detectors 810 (FIG. 8) that receives reflections resulting from all the lasers 211 of the array lidar 210. As discussed with reference to FIG. 8, when the optical detector array 220 includes more than one optical detector 810, the optical detector array 220 may be arranged according to a hexagonal construct 201 like the array lidar 210. A controller or processing system 230 may include one or more processors 231 and one or more memory devices 232 along with other known components in order to control transmission by each of the lasers 211 of the array lidar 210 as well as processing of received reflections by the optical detector array 220. In alternate embodiments, the processing of received reflections may be done by another processing system 230 that is in communication with the processing system 230 that controls the array lidar 210. As FIG. 2 shows, the array lidar 210 may be used to scan the field of view 235 in both azimuth 212 and elevation 213. Further each laser 211 gives a range to a target in the field of view 235. Thus, the array lidar 210 provides a three-dimensional image in which each reflection resulting from each pulse emission by a laser 211 may be considered a pixel in the image. The hexagonal construct 201 used to arrange the lasers 211 of the array lidar 210 according to embodiments is detailed further below.

Figure 3:
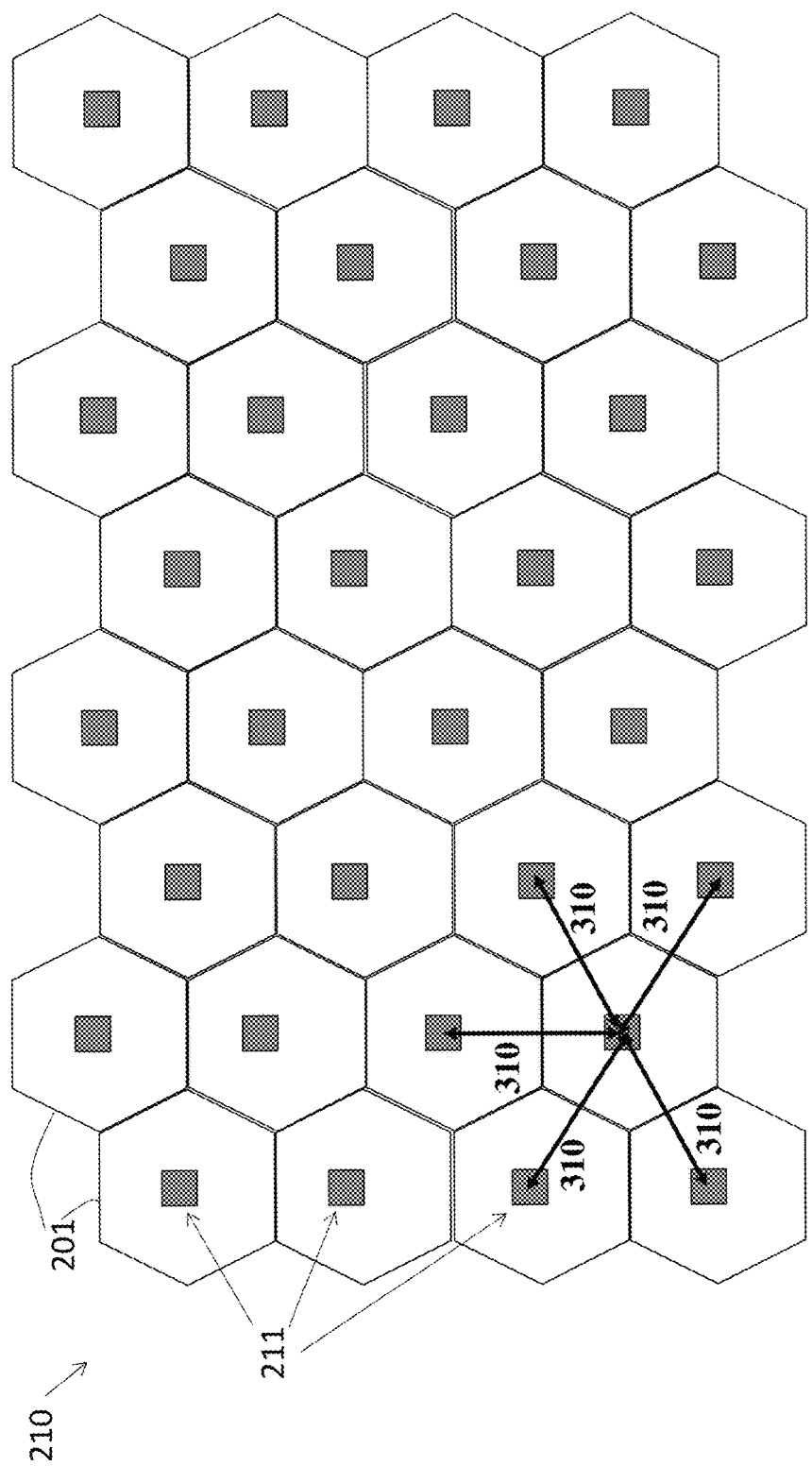
FIG. 3 shows a hexagonal construct of the array lidar according to embodiments.

FIG. 3 shows a hexagonal construct 201 of the array lidar 210 according to embodiments. The distance 310 between a given laser 211 of the array lidar 210 and any adjacent laser 211 is a constant value (or a multiple of a constant when one or more hexagonal constructs 201 are not populated with lasers 211). The exemplary array lidar 210 includes 24 lasers 211. The conventional array lidar 110, arranged according to the rectangular construct, also includes 24 lasers 111. As a comparison of FIG. 3 and FIG. 1 indicates, the total area required for the lasers 211 in the array lidar 210 is smaller than the area required for the lasers 111 in the array lidar 110. As discussed below, the hexagonal construct 201 according to embodiments herein also reduces unilluminated areas between the fields of view of the lasers 211.

Figure 4:
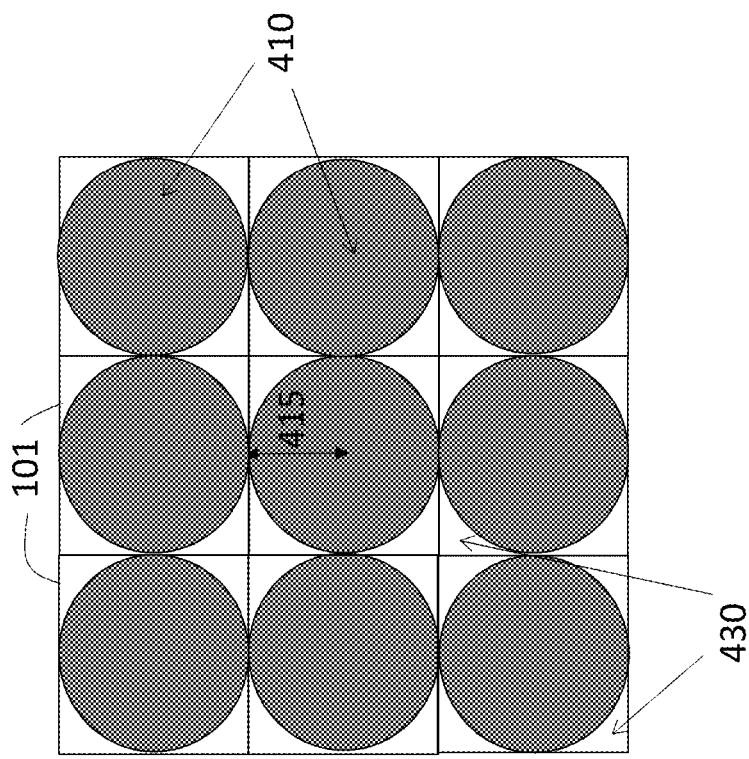
FIG. 4 shows a comparison of illuminated to unilluminated areas for the rectangular construct and the hexagonal construct according to embodiments.
Figure 4:
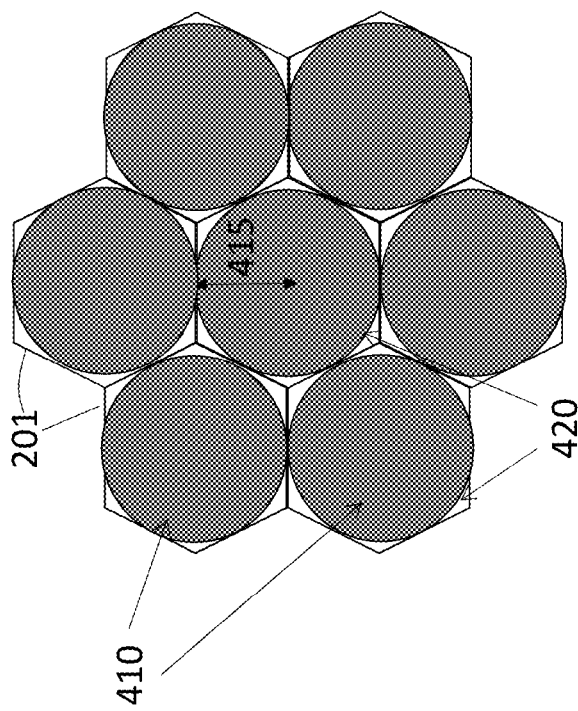

FIG. 4 shows a comparison of illuminated to unilluminated areas for the rectangular construct 101 and the hexagonal construct 201 according to embodiments. When the lasers 111 arranged according to the rectangular construct 101 and the lasers 211 arranged according to the hexagonal construct 201 are the same, the illuminated area 410 resulting from each of the lasers 111 and the lasers 211 will be the same, as indicated by the radius R 415 in FIG. 4. That is, the illuminated area 410 is given by:

$$\text{illuminated\_area} = \pi R^2 \quad [\text{EQ. 1}]$$

Yet, as FIG. 4 shows, the unilluminated area 420 resulting from arranging the lasers 211 according to the hexagonal construct 201 is much smaller than the unilluminated area 430 resulting from arranging the lasers 111 according to the rectangular construct 101. That is, the area of each cell of the hexagonal construct 201 is given by:

$$\text{hex\_area} = 2\sqrt{3}R^2 \quad [\text{EQ. 2}]$$

The area of each cell of the rectangular (square) construct 101 is given by:

$$\text{rec\_area} = (2R)^2 \quad [\text{EQ. 3}]$$

Put another way, because the illuminated area 410 is the same according to both constructs and the total area is greater according to the rectangular construct 101, there is a larger unilluminated area 430 as a result of the rectangular construct 101 than the unilluminated area 420 as a result of the hexagonal construct 201. Specifically, the difference between the area of the cell according to the rectangular construct 101 (EQ. 3) and the illuminated area 410 (EQ. 1), which is the unilluminated area 430, is given by:

$$\text{rec\_unilluminated} = (4-\pi)R^2 \quad [\text{EQ. 4}]$$

The difference between the area of the cell according to the hexagonal construct 101 (EQ. 2) and the illuminated area 410 (EQ. 1), which is the unilluminated area 420, is given by:

$$\text{hex\_unilluminated} = (2\sqrt{3}-\pi)R^2 \quad [\text{EQ. 5}]$$

As a comparison of EQ. 4 and EQ. 5 indicates, the unilluminated area 430 resulting from arranging the lasers 111 according to a rectangular construct 101 (EQ. 4) is larger than the unilluminated area 420 resulting from arranging the lasers 211 according to a hexagonal construct 201 (EQ. 5). The ratio of the illuminated area 410 to the unilluminated area 420 (ratio of EQ. 1 to EQ. 5 results) may be referred to as the cell fill factor for each hexagonal cell indicated by the hexagonal construct 201. The ratio of the illuminated area 410 to the unilluminated area 430 (ratio of EQ. 1 and EQ. 4 results) may be referred to as the cell fill factor for each rectangular cell indicated by the rectangular construct 101. The unilluminated area 420 resulting from the hexagonal construct 201 is 0.37 times smaller than the unilluminated area 430 resulting from the rectangular construct 101 for the same field of view, same laser beam frequencies, and no overlapping laser beams 216. Thus, the cell fill factor for the hexagonal construct 201 is much larger than the cell fill factor for the rectangular construct 101.

Figure 5:
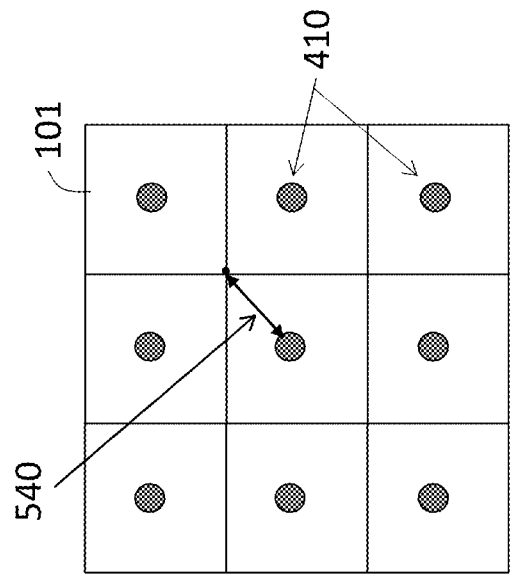
FIG. 5 indicates miss-illumination distance (MID) for the rectangular construct and the hexagonal construct according to embodiments.
Figure 5:
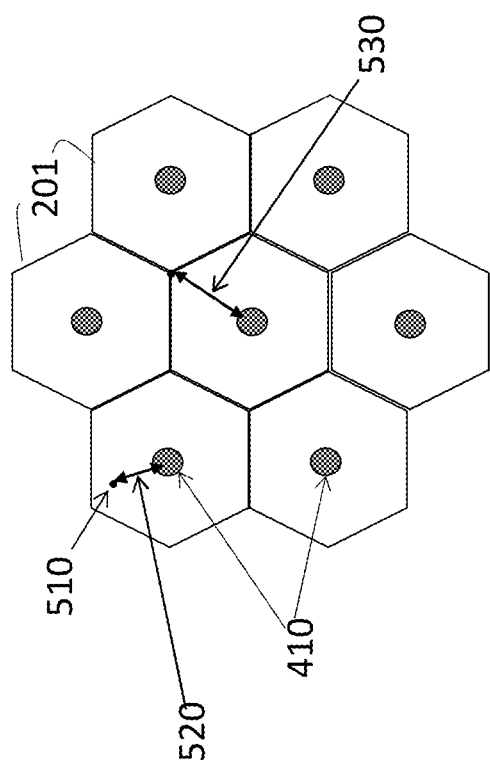

FIG. 5 indicates miss-illumination distance (MID) for the rectangular construct 101 and the hexagonal construct 201 according to embodiments. MID is another (related) figure of merit to cell fill factor and is defined as the distance between an unilluminated point and the nearest illuminated point. For purposes of clearly indicating MID for explanatory purposes, the illuminated area 410 is shown to be smaller in FIG. 5 than in FIG. 4. An exemplary MID 520 is shown for the unilluminated point 510. Maximal MID 530 for the hexagonal construct 201 is the largest possible distance from a point on the boundary of the illuminated area 410 to an unilluminated point, and the maximal MID 540 for the rectangular construct 101 is the largest possible distance from a point on the boundary of the illuminated area 410 to an unilluminated point, as shown. The smaller the maximal MID (e.g., 530 is smaller than 540), the less sparse (i.e., more dense) the laser beam 216 sampling such that more details may be obtained from targets within the field of view. The hexagonal construct 201 yields minimal average MID and smaller maximal MID 530 for a given number of lasers 211 than the rectangular construct 101.

Figure 6:
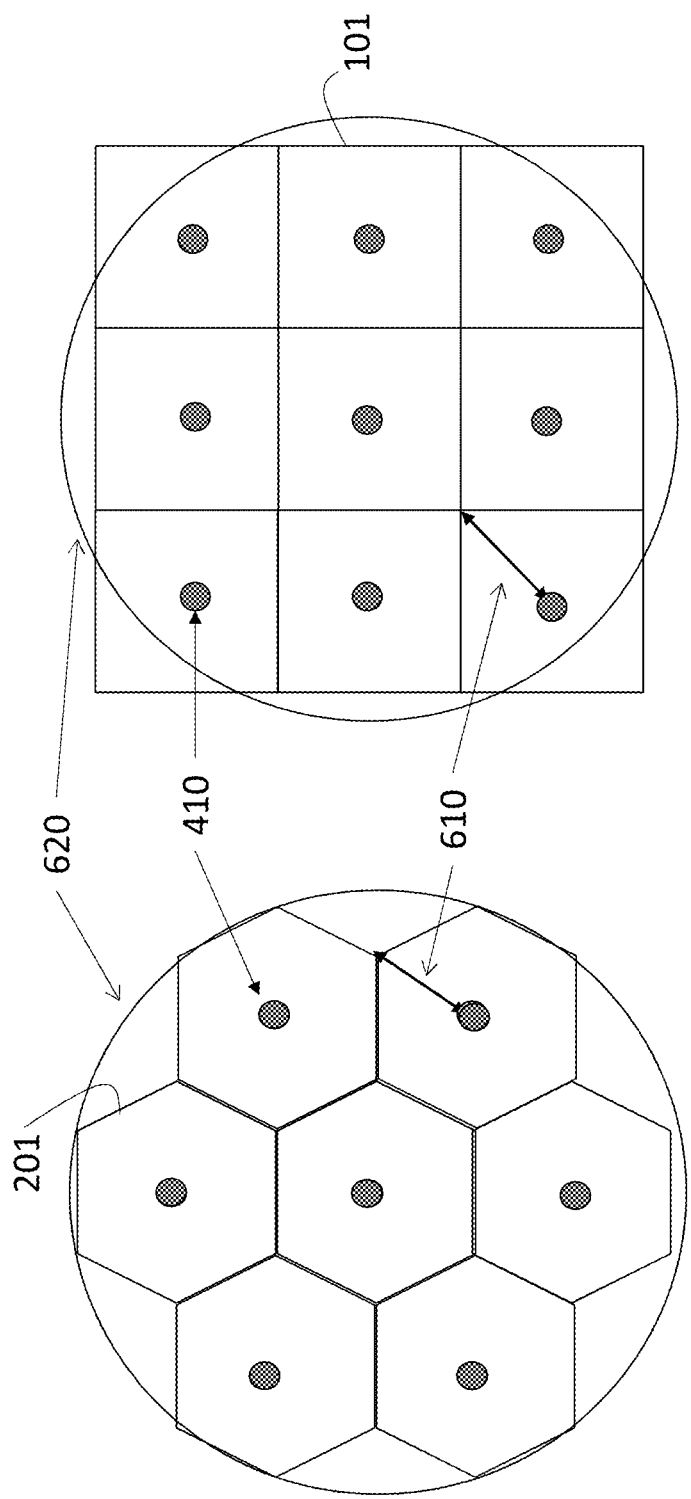
FIG. 6 shows an arrangement to obtain the same maximal miss-illumination distance (MID) according to the rectangular construct and the hexagonal construct according to embodiments.

In addition, the hexagonal construct 201 yields a minimal number of lasers 211 to obtain a given average or maximal MID. That is, in order to have the same maximal MID with a hexagonal construct 201 and a rectangular construct 101, a larger number of lasers 111 would be needed in the rectangular construct 101. This is illustrated in FIG. 6. Again, the illuminated area 410 is shown smaller than in FIG. 4 for explanatory purposes. In FIG. 6, the maximal MID 610 is the same for the hexagonal construct 201 and the rectangular construct 101. However, this reduction in the maximal MID 610 according to the rectangular construct 101 requires that the rectangles are smaller (than those in FIG. 5, for example). As a result, as indicated in FIG. 6, nine lasers 211 (corresponding with the nine illuminated areas 410 shown) are needed according to the rectangular construct 101 versus seven lasers 111 according to the hexagonal construct 201 within the same area 620. The reduction in the number of lasers 211 needed according to the hexagonal construct 201 (as compared with the number of lasers 111 needed according to the rectangular construct 101) is approximately 23%. For another comparison, the lasers 111, 211 may be considered to be point sources at the center of the rectangular construct 101 and the hexagonal construct 201, respectively. The maximal MID is then the distance e from the center of the construct to a corner. The area of a square cell according to the rectangular construct 101 is $2e^2$, and the area of a hexagonal cell according to the hexagonal construct 201 is $$\frac{3\sqrt{3}}{2}e^2.$$

For a given field of view area A, the number of square cells $N_s$ needed according to the rectangular construct 101 is:

$$N_s = \frac{A}{2e^2} \qquad [EQ.\ 6]$$

and the number of hexagonal cells $N_h$ needed according to the hexagonal construct 201 is:

$$N_h = \frac{2A}{3\sqrt{3}\ e^2} \qquad [EQ.\ 7]$$

As a comparison of EQ. 6 with EQ. 7 indicates, $N_s$ is greater than $N_h$ such that more square cells are needed than hexagonal cells for the same field of view. Specifically, the ratio $N_h/N_s$=0.769.

Figure 7:
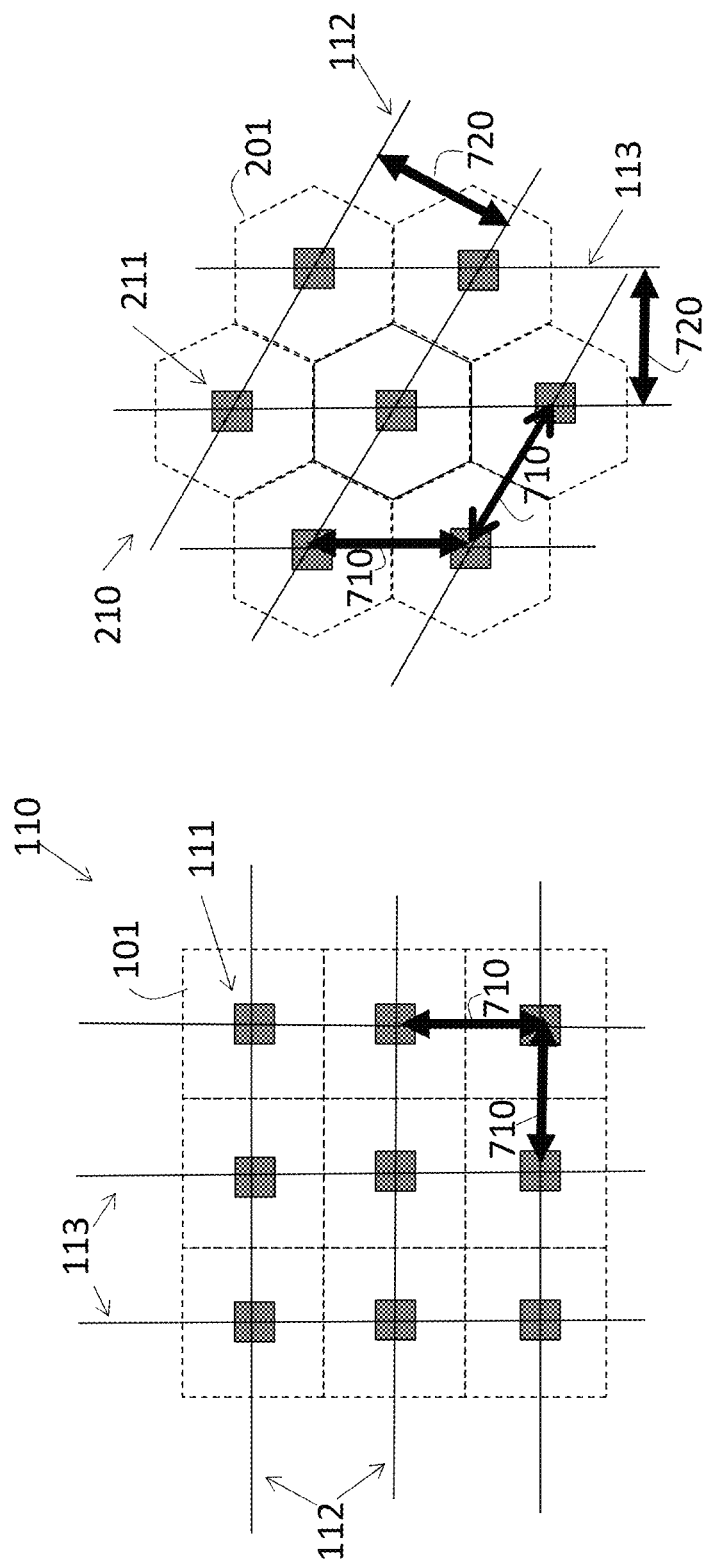
FIG. 7 shows wiring for the hexagonal construct according to embodiments.

FIG. 7 shows wiring for the rectangular construct 101 and the hexagonal construct 201 according to embodiments. A portion of the array is shown arranged according to a rectangular construct 101 and a hexagonal construct 201. Each construct is shown as a dashed line to clarify that the construct is merely a mechanism by which to determine the location of the laser 111, 211. The ground wires 112 and current-carrying wires 113 are shown for both constructs and are not limited in their orientation (i.e., the sets of wires may be switched). The distance 710 between adjacent lasers 111 arranged according to the rectangular construct 101 is the same as the distance 710 between adjacent lasers 211 arranged according to the hexagonal construct 201. As FIG. 7 illustrates, the spacing between adjacent parallel wires 112, 113 is also at the distance 710 for the rectangular construct 101. However, the spacing between adjacent parallel wires 112, 113 is a distance 720, which is less than the distance 710, for the hexagonal construct 201. With d representing the distance 710 and dd representing the distance 720, dd is given by:

$$dd = \frac{\sqrt{3}\,d}{2} \qquad [EQ.\ 8]$$

Because dd (the distance 720) is less than d (the distance 710), the wire density is increased in a given area.

Figure 8:
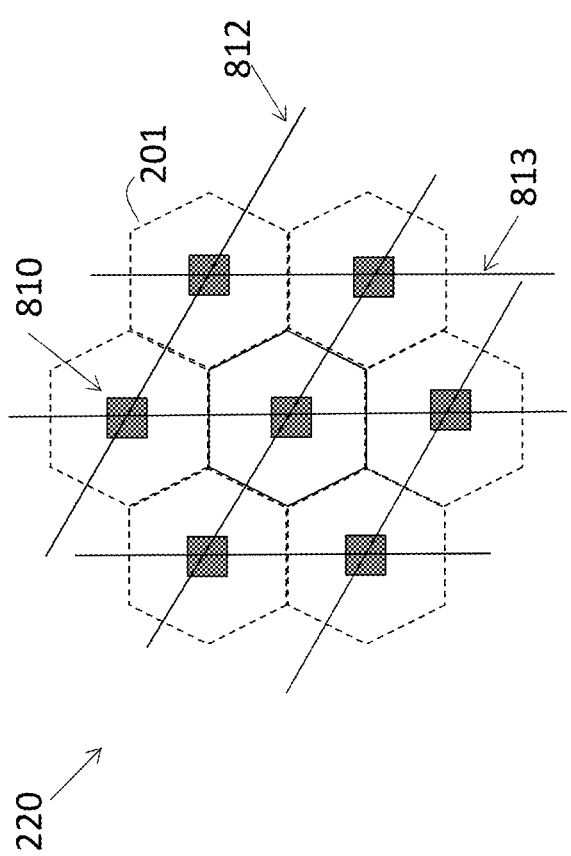
FIG. 8 shows an optical detector array arranged according to a hexagonal construct according to embodiments.

FIG. 8 shows an optical detector array 220 arranged according to a hexagonal construct 201 according to embodiments. Although a detector 810 is shown at the center of each hexagonal construct 201, one or more detectors may be placed anywhere within each hexagonal construct 201 (with the same placement repeated within every hexagonal construct 201), and one or more of the hexagonal constructs 201 may be left unoccupied. As shown in FIG. 7 for the array lidar 210, the wiring arrangement is shown for the optical detector array 220 in FIG. 8. A set of data reading wires 812 and ground wires 813 are shown. As noted with reference to FIG. 7, the orientation of the wires is not limited. Thus, for example, the ground wires 813 may be arranged diagonally while the data reading wires 812 are arranged vertically.

Figure 9:
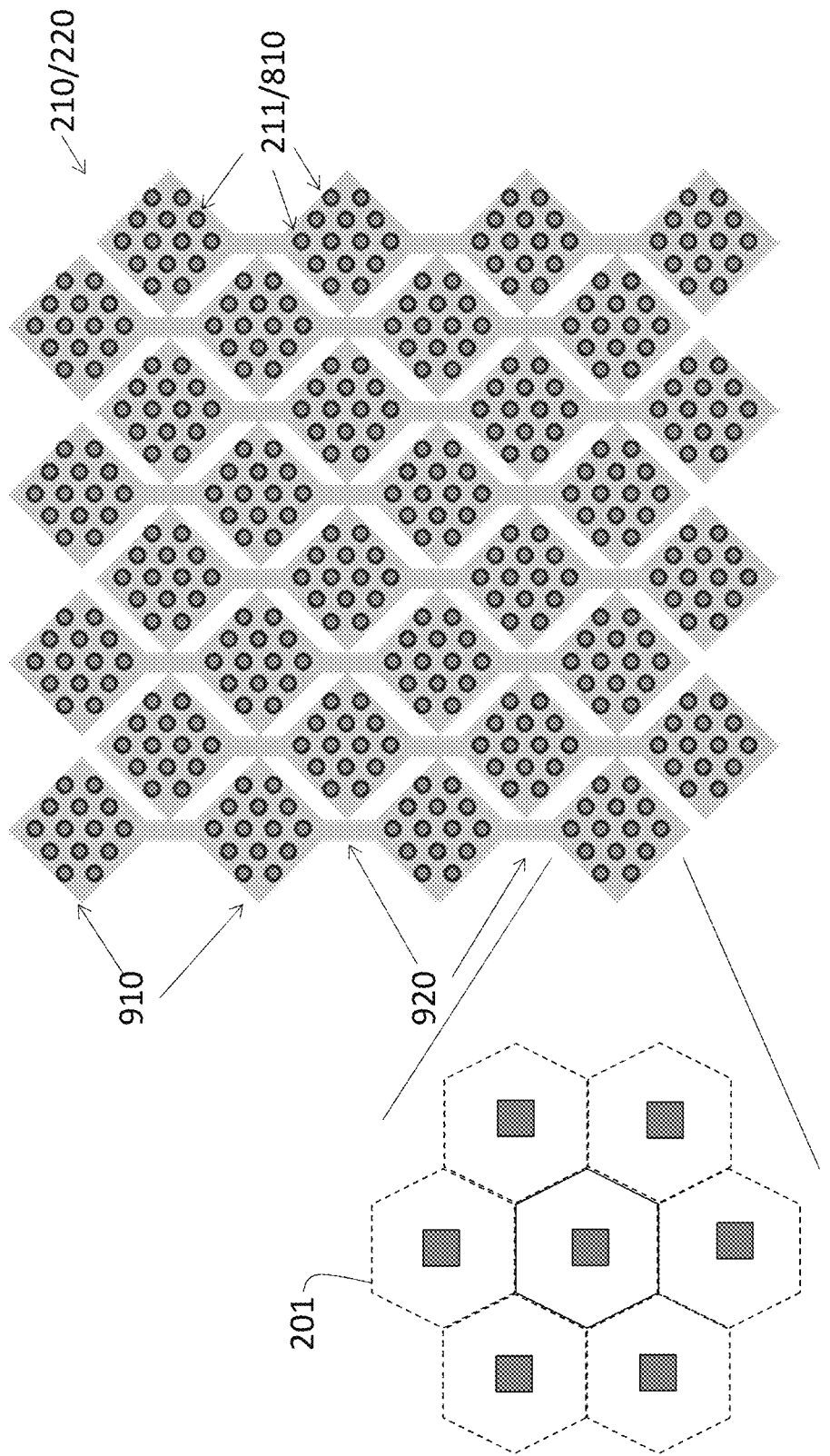
FIG. 9 shows a physical implementation of the array lidar (or optical detector array) according to embodiments.

FIG. 9 shows a physical implementation of the array lidar 210 (or optical detector array 220) according to embodiments. As noted throughout the description, the hexagonal construct 201 detailed according to the embodiments herein is not a physical hexagonal shape but, instead, a design construct used to determine placement of the illuminators (e.g., lasers 211, LEDs) or optical detectors 810. One exemplary physical support for the illuminators (211) or optical detectors 810 may be the diamond shapes 910 shown in FIG. 9. Each of the lasers 211 (or optical detectors 810) is placed according to the hexagonal construct 201. That is, each set of lasers 211 supported by each diamond shape 910 may be at a corner of a hexagonal construct 201 (as shown in FIG. 2) or at the center of a hexagonal construct 201 (as shown in FIG. 3), or two or more of the lasers 211 may be arranged within the same hexagonal construct 201. FIG. 9 illustrates that, once the hexagonal construct 201 is used to determine the arrangement of the lasers 211 (or other illuminators or optical detectors 810), that arrangement may be physically implemented and supported within other shapes. The connectors 920 shown in FIG. 2 may carry wires or include other components of the array lidar system 200.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of assembling an array lidar system comprising a plurality of illuminators and a plurality of detectors, the method comprising:
    designing a plurality of hexagons of a same size such that no gaps remain between adjacent ones of the plurality of hexagons;
    designing an arrangement of the plurality of illuminators or the plurality of detectors according to a hexagonal construct, the designing including arranging one or more illuminators of the plurality of illuminators or one or more detectors of the plurality of detectors within respective ones of the plurality of hexagons, wherein the one or more illuminators or the one or more detectors is at a same position within each of the respective ones of the plurality of hexagons;
    implementing the design by disposing the plurality of illuminators or the plurality of detectors according to the arrangement; and
    arranging a first set of wires along a first axis and arranging a second set of wires along a second axis, each of the plurality of illuminators or the plurality of detectors being associated with one of the first set of wires and one of the second set of wires, wherein the arranging the first set of wires and the arranging the second set of wires includes arranging ground wires and data-reading wires for the plurality of detectors.

2. The method according to claim 1, wherein the designing the plurality of hexagons includes determining a number of the plurality of hexagons to be equal to a number of the plurality of illuminators or the plurality of detectors in the array lidar system.

3. The method according to claim 1, wherein the designing the plurality of hexagons includes determining a size of the plurality of hexagons based on a specified field of view.

4. The method according to claim 1, wherein the arranging the first set of wires and the second set of wires includes arranging the first axis to be less than 90 degrees from the second axis.

5. The method according to claim 1, wherein the arranging the first set of wires includes setting a first distance between adjacent ones of the first set of wires to be less than a distance between adjacent ones of the plurality of illuminators or the plurality of detectors.

6. The method according to claim 5, wherein the arranging the second set of wires includes setting a second distance between adjacent ones of the second set of wires to be less than the distance between adjacent ones of the plurality of illuminators or the plurality of detectors.

7. The method according to claim 6, wherein the first distance and the second distance are a same value.

8. The method according to claim 1, wherein the arranging the first set of wires and the arranging the second set of wires includes arranging ground wires and current-carrying wires for the plurality of illuminators.

9. An array lidar system, the system comprising:
    a plurality of illuminators or detectors arranged according to a hexagonal construct, the hexagonal construct being comprised of a plurality of hexagonal shapes of a same size arranged with no gaps between adjacent ones of the plurality of hexagonal shapes, wherein one or more of the plurality of illuminators or detectors is arranged within a respective one of the plurality of hexagons and the one or more illuminators or detectors is at a same position within each of the respective ones of the plurality of hexagons;
    a first set of wires along a first axis; and
    a second set of wires along a second axis, wherein each of the plurality of illuminators or detectors is associated with one of the first set of wires and one of the second set of wires, and the first set of wires is ground wires and the second set of wires is data-reading wires associated with the plurality of detectors.

10. The system according to claim 9, wherein a number of the plurality of hexagonal shapes of the hexagonal construct is equal to a number of the plurality of illuminators or detectors.

11. The system according to claim 9, wherein the size of plurality of hexagonal shapes is based on a specified field of view of the array lidar system.

12. The system according to claim 9, wherein the first set of wires is ground wires and the second set of wires is current-carrying wires associated with the plurality of illuminators.

13. The system according to claim 9, wherein the first axis is less than 90 degrees from the second axis.

14. The system according to claim 9, wherein a first distance between adjacent ones of the first set of wires is less than a distance between adjacent ones of the plurality of illuminators or detectors.

15. The system according to claim 9, wherein a second distance between adjacent ones of the second set of wires is less than the distance between adjacent ones of the plurality of illuminators or detectors.

* * * * *